June 30, 1959     J. R. C. QUILTER     2,892,232
QUICK-RELEASE DEVICE FOR BODY HARNESS
Filed June 12, 1953     5 Sheets-Sheet 1
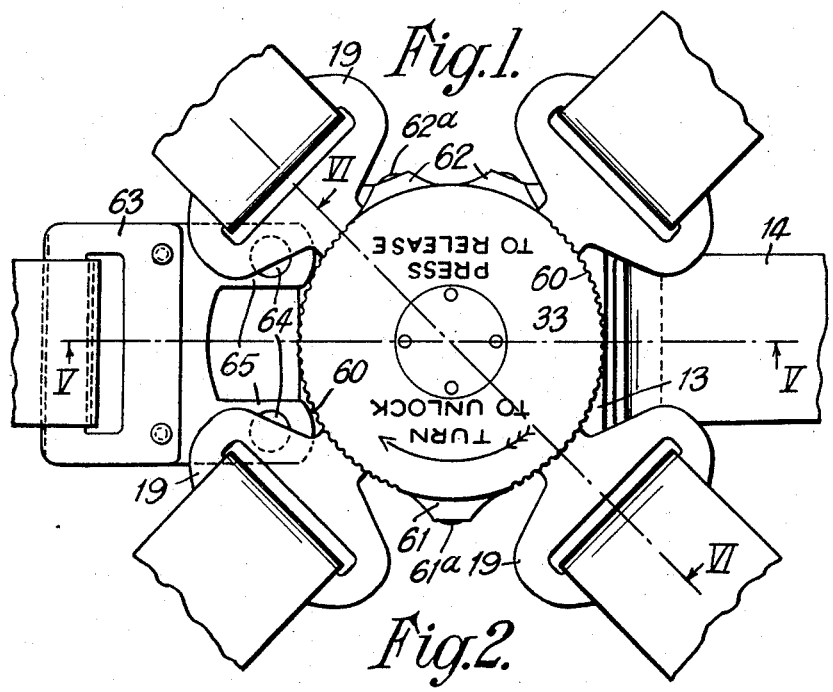
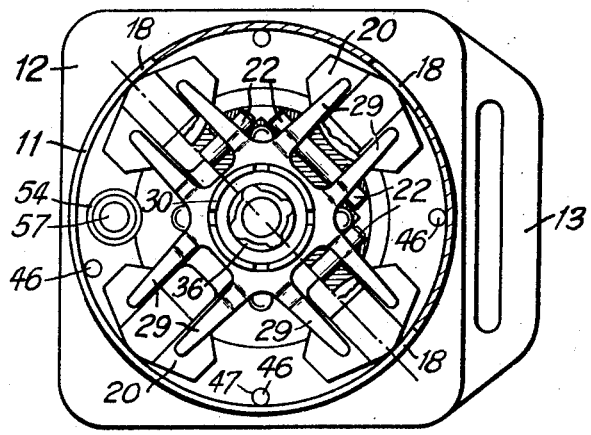
INVENTOR
John R.C. Quilter
By Shoemaker + Mattare
ATTORNEYS June 30, 1959 J. R. C. QUILTER 2,892,232
QUICK-RELEASE DEVICE FOR BODY HARNESS
Filed June 12, 1953 5 Sheets-Sheet 2
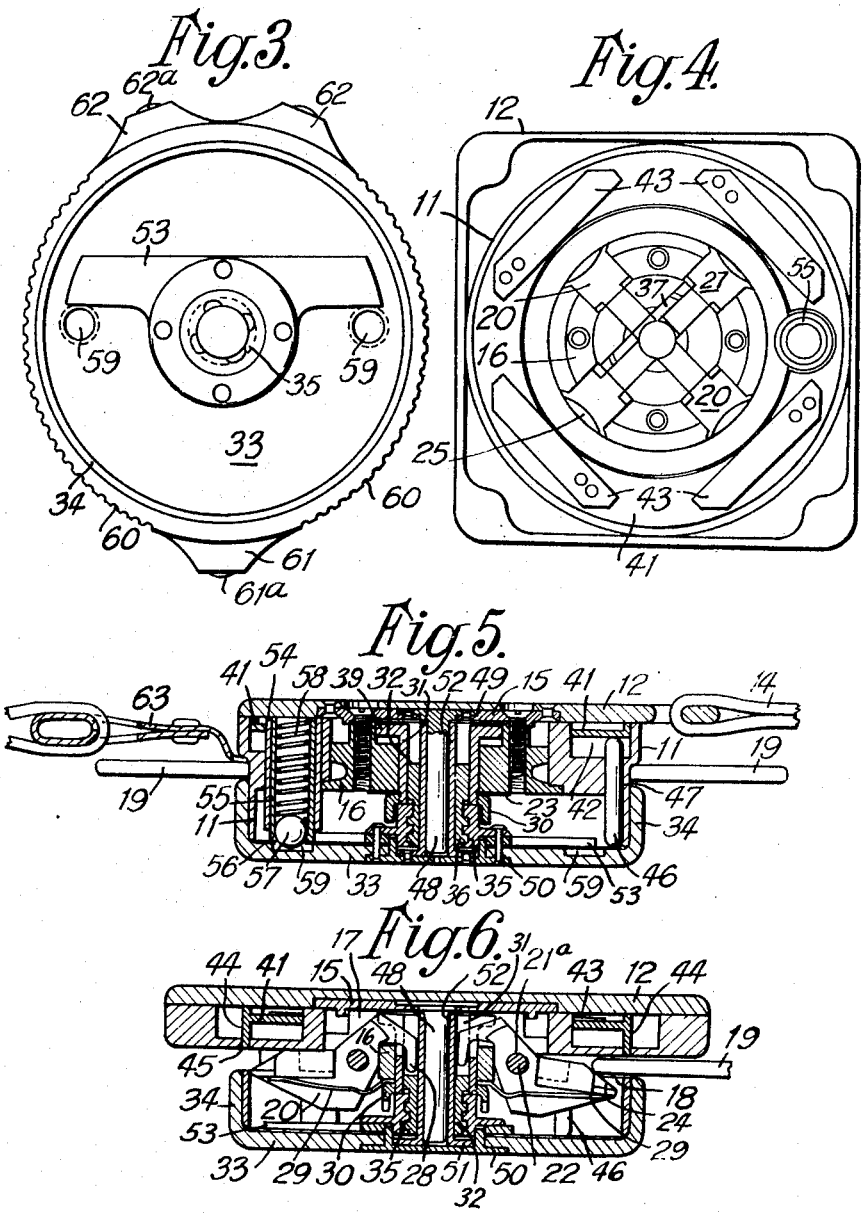
INVENTOR
John R. C. Quilter
By Shoemaker + Mathare
ATTORNEYS.

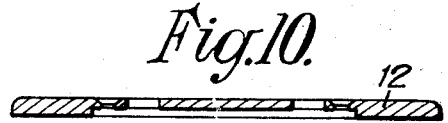
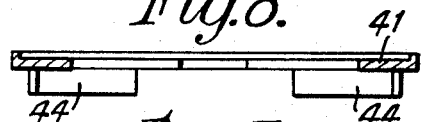
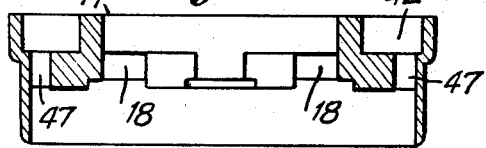
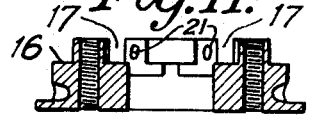
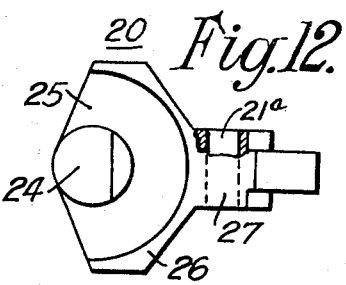
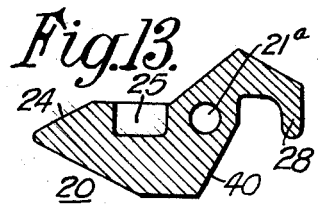
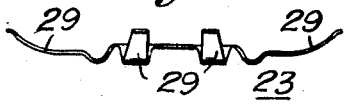
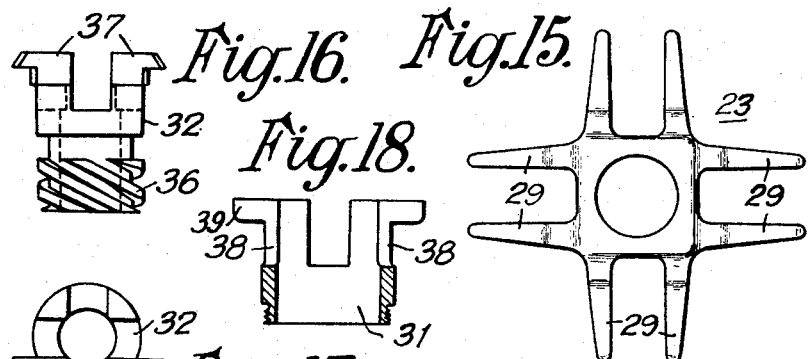
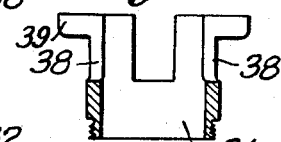

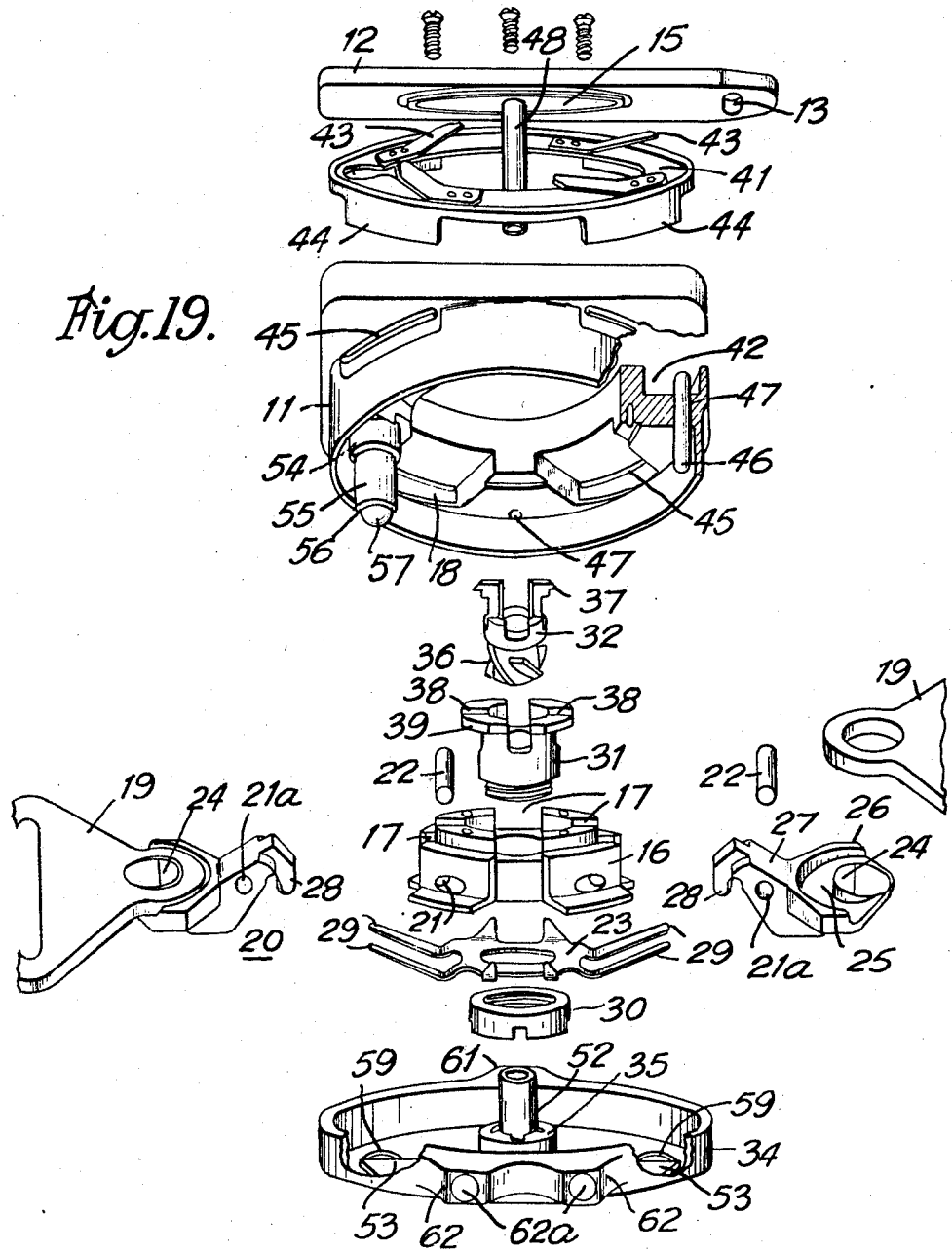

United States Patent Office … 2,892,232
Patented June 30, 1959

2,892,232

QUICK-RELEASE DEVICE FOR BODY HARNESS

John Raymond Cuthbert Quilter, Woking, England

Application June 12, 1953, Serial No. 361,323

5 Claims. (Cl. 24—205.17)

This invention relates to quick-release devices for body harness such as worn by aviators for the connection of parachutes, or by pilots or drivers for holding them safely in their seats.

The customary quick-release device for parachute harness is arranged for engagement of a number of harness straps by means of spring-loaded studs or plungers which can be operated to release the straps by a compound motion of a control member in the form of a knob projecting outwardly from the box or casing which houses the studs; the knob must first be turned in order to unlock the internal mechanism, and then it must be driven back towards the box or casing in order to effect the release of the straps by sliding the studs out of engagement with the strap lugs or the like. The sliding movement of the studs is subject to considerable friction, and the fact that the knob projects outwardly from the box or casing in the normal position involves an appreciable addition to the overall thickness of the device, which may be objectionable in the case of a restricted entrance to the cockpit or seat; it also means that the device may be accidentally released by a blow upon the knob sufficiently heavy to overcome the safety locking means, in spite of the knob not having been given the preliminary turn.

The present invention has for its main object the provision of a quick-release device having the same functions as the customary device and operated by the same sequence of steps, viz., a preliminary unlocking turn and a final blow or pressure to effect the release, but free from the disadvantages mentioned above; in particular, sliding movement of the locking studs is replaced by a pivotal movement of spring-loaded rockers, each movable independently of the others; the operating knob or control member is normally located close against the box or casing, so that the device can be made correspondingly thin and compact, there being no risk of the knob being accidentally driven back towards the box sufficiently to release the harness before being unlocked. Moreover, means are provided for avoiding risk of any straps or lines becoming wedged between the control member and the face of the release box, when said control member is displaced axially as a preliminary to release of the harness.

Another object of the invention is to provide a body harness release device which prevents entry of the harness strap lugs or the like while the control member is unlocked, while allowing free entry of the lugs in any desired order and number so long as the control member is properly locked.

A further object is to provide a quick-release device of this character having means for identifying the position of the control member both visually and by feel, so that the operator may readily ascertain whether it is locked or unlocked.

Other objects and advantages of the invention will hereinafter appear from the following description of a preferred embodiment, given with reference to the accompanying drawings, in which:

Fig. 1 is a front view of the quick-release box in the preferred embodiment, four harness straps being shown with their lugs engaged in the box, and an additional web ready for engagement;

Fig. 2 is a front view of the box, on a slightly larger scale, the control member being removed and portions of the interior mechanism thus disclosed being shown in section;

Fig. 3 is a view of the inner face of the control member;

Fig. 4 is a rear view of the box, the base being removed in order to disclose the interior;

Fig. 5 is a section on the line V—V of Fig. 1, the control member being in locked position, and the strap lugs as well as the additional web being in engagement;

Fig. 6 is a section on the line VI—VI of Fig. 1, showing only one of the strap lugs being fitted into engagement, the control member being still in locked position and one of the rockers being partly tilted by an entering strap lug;

Figs. 7 to 11 are sections of the box casing, shutter, back plate, base and core member all being shown in section on the line V—V of Fig. 1;

Figs. 12 and 13 are enlarged details of one of the rockers for holding the strap lugs in engagement;

Figs. 14 and 15 show a spring for controlling the tilting movement of the rockers;

Figs. 16 and 17 represent a tubular member on which the control member is mounted;

Fig. 18 shows a sleeve inside which the tubular member is slidable axially;

Fig. 19 is an exploded view, with parts in section, showing the elements of the quick-release box in relation to one another; only two of the rockers are shown, one having a strap lug engaged upon it and the other having its strap lug placed above it.

Figure 6A:
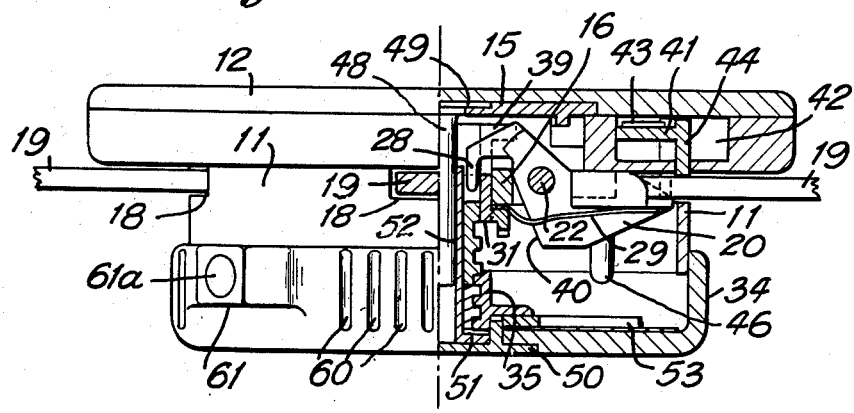
Fig. 6a is a partial section similar to Fig. 6, but showing the device in unlocked position ready for release.

In the embodiment illustrated, the quick-release box comprises a casing 11 (Fig. 7) of cylindrical shape, with a base 12 (Fig. 10), the latter being of substantially square shape with an attachment device at one side, such as a slotted projection 13 (Figs. 1 and 2) which can be secured to a waist-belt 14 or the like, in the customary manner. Upon the base 12, there is secured internally a back plate 15 (Fig. 9), to which there is fixed (for example by screws, as shown in Fig. 5) an annular core-member 16 (Fig. 11); this member has four radial recesses 17, evenly spaced and aligned with four radial slots 18 in the peripheral wall of the casing, the slots being adapted to receive the lugs 19 of four harness straps, as shown in Figs. 1 and 5. When entered in the slots 18, the lugs 19 are engaged by rockers 20 (Figs. 12, 13) mounted in the radial recesses 17 in the core-member 16; holes 21 extending at right angles to the respective sides of the radial recesses 17 support opposite ends of pins 22 upon which the rockers are pivoted. The rockers are spring-loaded, as by one or more springs 23 (Figs. 14 and 15) which tend to hold their hooks or studs engaged in the strap lugs 19; the outer end of each rocker 20 is of spatulate form, with a bevelled stud portion 24 at the center of an arcuate trough 25 which can accommodate the strap lug engaged by the stud. The outer wall 26 of this trough merges into a hub or boss 27 bored with a transverse hole 21a to receive the pin 22, and the hub is provided with a tooth or tongue 28 forming the inner end of the rocker. The loading spring 23 consists of a steel stamping having forked or duplicated leaves 29 pressing at their outer ends upon the spatulate extremities of the rockers 20; the spring is secured centrally as by a ring-nut 30 upon a sleeve 31 surrounding a tubular member 32 on which the control member 33 is screwed, so that in addition to holding the hooks or studs 24 in engaged position, the spring tends to push the sleeve 31 downward, as viewed in Figs. 5 and 6, and outwardly in relation to the casing 11, together with the control member. Evidently more than one spring may be employed; for example two or more such springs may be superposed to form laminations, the leaves being of successively increasing length, if desired.

The control member 33 is preferably made in the form of a flanged disc or knob, having a flange or skirt 34 lapping closely around the box, with an amount of lap such that even in its forward position there is no clearance liable to risk straps or lines becoming wedged between it and the face of the box; in other words, the depth of the flange or skirt is not less than the axial travel of the control member. The latter is provided internally with a nut 35 of quick-pitch multi-start type, for example a four-start screw of half-inch diameter and half-inch pitch, giving an axial travel of one-quarter inch for a half turn of the knob. This nut 35 is engaged by a correspondingly screw-threaded portion 36 of the tubular member 32, which is prevented from turning with the nut by a pair of claws or wings 37 thereon, in slidable engagement with approximately radial guide surfaces, such as notches 38 formed in the sleeve 31 to clear the inner ends of the rockers 20, the sides of the radial recesses 17 and/or the adjacent sides of the rocker hubs 27, as seen in Fig. 4.

In the normal locked position, the screw-threads on the parts 32 and 35 have an engaged length of about three-eighth of an inch, so that when the control member 33 is threadably backed off from the slidable member 32 by a half-turn of the knob, giving an axial travel of one-quarter inch, the screw threads remain in engagement for a length of one-eighth of an inch, thereby keeping the control member 33 from being completely separated from the casing 11; while the control member is being backed off relatively to the slidable member 32, the latter is held from turning by its wings 37 engaged in two of the radial recesses 17 of the stationary core-member 16 and against the adjacent sides of the rocker hubs 27 in these recesses. In assembling the device, prior to the attachment of the base 12, the control member can be given more than half a turn of the knob for initial engagement of the screw-threads on the parts 32 and 35, but after the attachment of the base the rotation of the control member is limited to a half-turn (180°) by means hereinafter described.

Figure 6B:
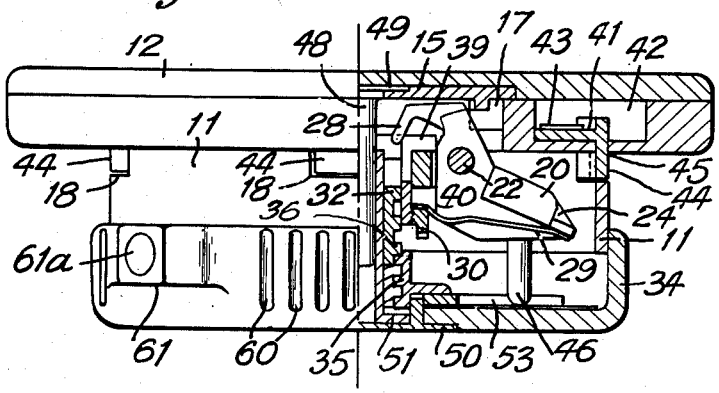
Fig. 6b is a partial section similar to Fig. 6, but showing the device in disengaged position.

The rockers 20 have their inner ends 28 engageable by the axially slidable member 32, so that when the control member 33 has been turned to unlock and thereby screwed outwardly from the box, as seen in Fig. 6a, and is thereafter forced back for releasing the lugs 19, the member 32 strikes these inner ends 28 and causes the rockers to pivot as seen in Fig. 6b, thereby disengaging the studs 24 from the strap lugs 19. At the same time, the spring 23 will slide the sleeve 31 downwards, as viewed in Figs. 5 and 6, and latch the rockers in the disengaged position, by the action of a radial flange 39 at the base of the sleeve 31, which advances to wedge against flat faces 40 on the hubs 27 so as to latch the rockers against return until the control member is screwed back to its normal "locked" position (Fig. 6), when the nut 35 will push back the sleeve 31 and leaf spring 23, causing the rockers to return to their operative position, ready to engage the strap lugs when inserted.

With the control member or knob 33 in its normal "locked" position, close against the front of the box or casing 11, the strap lugs 19 may be entered through the slots 18 in the outer wall of the casing, each lug lifting the bevelled hook or stud 24 of the respective rocker and the latter being returned to engaged position by the action of the leaf spring 23; a preliminary unlocking movement, before the harness straps can be released, will consist in turning the knob 33 through 180°, thereby screwing it outwardly from the casing 11. The member 32 is prevented from turning by its wings 37 which are slidably but non-rotatably guided in two opposite recesses 17 beside the inner ends of two rockers 20, as seen in Fig. 4; it remains stationary until pressed back by the control member 33 after the latter has been unlocked. Thereupon the base end of the member 32 will strike the inner ends of the rockers 20 and disengage their studs 24 from the strap lugs 19, while the spring 23 will draw the sleeve 31 out into the latching position so as to prevent the return of the rockers. In order to reset the device, the control member 33 is turned back through 180° in the opposite direction, which causes the sleeve 31 to be pushed back, thereby releasing the rockers 20, and the member 32 to be drawn forwards, thereby allowing the rockers to return by action of the leaf spring 23 to their normal position for engagement, while the control member 33 comes back close against the box or casing 11.

Means may be provided for preventing the entry of strap lugs 19 into the slots of the release box while the control member or knob 33 is at an unsafe position, i.e., turned from the "locked" position and moved outwardly from the box; for example, these slots may be guarded by a mask or shutter which is displaced only by the axial travel of the control member when returned to normal locked position. The shutter is shown as comprising a loose washer plate 41 (Fig. 8) enclosed by the base 12 and movable within an annular groove 42 in the casing, a number of leaf springs 43 (Figs. 4 and 6) tending to press the plate forward; from the circumference of this plate a number of arcuate tongues 44 extend through part-circular slots 45 in the casing, just inside its outer wall and adjacent to the several slots which receive the lugs 19, these tongues constituting the shutter members. The washer plate 41 can be forced back against the action of its leaf springs by the helical locking movement of the control member 33 which actuates a plurality of rods 46 (Fig. 5) in engagement with the washer plate 41, these rods being slidable in holes 47 in the casing; the locking movement forces the tongues back into the slots 45, to allow the entry of a strap lug or lugs in the locked position, but the tongues project out of their slots so as to prevent entry of the lug when the control member 33 is unlocked and the leaf springs 43 can force the washer plate 41 outwards as seen in Fig. 6b. The release of the harness by forcing back the control member 33 after it has been unlocked will also force back the washer plate 41 and thereby displace the mask or shutter, thus relieving the pressure of the tongues 44 against the strap lugs 19, but only momentarily, the control member and shutter returning outwards by the effect of the springs 29 and 43, as soon as the lugs 19 have been disengaged; the shutter will then remain in its obstructive position until the control member is turned to locked position, whereupon the device is ready for re-engagement of the strap lugs.

The control member 33 may be steadied by means of a central pin 48 secured to the base of the casing, for example by riveting the head of the pin in a recess 49 in the base plate 15; a central disk portion 50 of the control member having riveted thereto a flange 51 integral with a bush 52 fitting upon the steady pin 48 and supporting the tubular member 32. Rivets securing the disk 50 in place may serve to secure upon the internal face of the control member a double stop arm 53 for limiting its rotation, as well as the nut 35 engaging with the screw-threaded member 32, which is slidable outside the bush 52 but prevented from turning by the wings 37 engaging with the recesses 17 and with corresponding notches 38 in the sleeve 31.

A tubular pillar 54 (Fig. 5) secured in the casing 11 near one side thereof encloses a slidable plunger 55 having its outer end 56 contracted or spun over so as to contain a ball 57 pressed forward by means of a coiled spring 58 inside the plunger, this ball pressing against the inner face of the control member; two shallow holes 59 formed in this face, located at diametrically opposite points, can be engaged by the ball in the two extreme positions of the control member. The range of movement is limited to 180° by the tubular pillar 54 co-operating with the double stop arm 53, one arm engaging with the pillar when the ball 57 rests in one of the locating holes 59 and the other arm engaging with the other side of the pillar when the ball rests in the other locating hole.

The circumferential flange or skirt 34 of the control member may be serrated as indicated at 60, to facilitate its grasp by the operator, and it is preferably formed with means for identifying its position both visually and by feel; for example, the point of its circumference which normally occupies the lowermost position, and is therefore concealed from the operator, may be marked by a boss 61 containing a plug 61a of red material, while on the opposite side of the circumference there may be placed two bosses 62 containing plugs 62a of green material. Thus the operator can make sure that the device is in the locked position, either by observing the green material or by feeling for the two plugs 62, knowing that they should be at the top.

Where a secondary webbing is to be connected to the release box, in addition to the usual four harness straps, the additional webbing may be provided with a double-eye plate 63 (Figs. 1 and 5) having two eyes 64 upon parallel lugs 65 spaced apart at the same distance as that between two adjacent studs 24 or hooks in the release box; the two eyes 65 will be engaged with the two studs 24 after the main harness straps have been connected to these studs, by slipping the eyes 64 behind the lugs 19, as indicated in Figs. 1 and 5.

What I claim is:

1. A quick-release device for body harness, comprising a casing provided with a peripheral wall, said wall having angularly spaced slots for entry of harness elements, a core-member within said casing, said core-member having radial recesses aligned with said angularly spaced slots, spring-loaded rockers mounted in said radial recesses, said rockers being provided with studs for retaining harness elements entered through said slots, a control member mounted for part-rotation upon said casing, an axially slidable release member mounted within said core-member and adapted to tilt said rockers for release of said harness elements, said control member having screw-threaded engagement with said release member, and means for positively latching said rockers in tilted position, said latching means including a sleeve surrounding said release member, and means for sliding said sleeve in reverse direction to said release member for engaging said rockers when tilted by axial sliding of said release member.

2. A quick-release device for body harness, comprising a casing provided with a peripheral wall, said wall having angularly spaced slots for entry of harness elements, a core-member within said casing, said core-member having radial recesses aligned with said angularly spaced slots, spring-loaded rockers mounted in said radial recesses, said rockers being provided with studs for retaining harness elements entered through said slots, a control member mounted for part-rotation upon said casing, a release member slidable axially within said core-member and adapted to tilt said rockers for release of said harness elements, said release member including screw-threads, a screw-threaded member secured to said control member and engaging with the screw-threads of said release member, the part-rotation of said control member shifting it outwardly from said casing and its subsequent axial movement towards said casing displacing said release member for tilting said rockers, means for positively latching said rockers in tilted position, and means for preventing rotation of said release member during part-rotation of said control member and said screw-threaded member.

3. A quick-release device for body harness, comprising a casing provided with a peripheral wall, said wall having angularly spaced slots for entry of harness elements, means for obstructing said slots to prevent entry of harness elements, spring-loaded rockers within said casing, said rockers being provided with studs for retaining harness elements entered through said slots, a control member mounted for part-rotation upon said casing, means for displacing said obstructing means to inoperative position by a part-rotation of said control member, and an axially slidable release member mounted within said casing and adapted to tilt said rockers for release of said harness elements, said control member having screw-engagement with said release member, whereby a part-rotation of said control member in one direction will move it outwardly from said casing and longitudinally of said release member, and a subsequent axial movement of said control member towards said casing will cause said release member to tilt said rockers for release of said harness elements, said obstructing means then operating to prevent re-entry of harness elements until displaced to inoperative position by part-rotation of said control member in the opposite direction for returning it towards said casing.

4. A quick-release device for body harness, comprising a casing provided with a peripheral wall, said wall having angularly spaced slots for entry of harness elements, a core-member within said casing, said core-member having radial recesses aligned with said angularly spaced slots, rockers mounted in said radial recesses, the outer ends of said rockers being provided with bevelled studs for retaining harness elements entered through said slots, spring means normally holding said rockers in element retaining position, a control member mounted for part-rotation upon said casing, and an axially slidable member mounted in said core-member and adapted to press against the inner ends of said rockers for release of said harness elements, said control member having screw-engagement with said axially slidable member, whereby part-rotation of said control member will move it outwardly from said casing and longitudinally of said axially slidable member, a subsequent inward movement of said control member driving said axially slidable member against the inner ends of said rockers for release of said harness elements, and positive means for latching said rockers out of element-retaining position until said control member is returned to its original position, said positive latching means being controlled by said spring means.

5. A quick-release device for body harness, comprising a casing provided with a peripheral wall, said wall having angularly spaced slots therein for entry of harness elements, spring-loaded engagement means within said casing for retaining harness elements entered through said slots, a control member mounted for part-rotation and axial movement upon said casing, an axially slidable release member mounted within said casing, said control member having screw-threaded engagement with said release member, initial part-rotation of said control member moving it outwardly from said casing by screwing back upon said release member, and axial movement of said control member then displacing said release member to cause release of said engagement means, and means for obstructing said slots to prevent re-entry of said harness elements until said control member has been returned to its initial position, said obstructing means including a washer plate movable axially within said casing, a plurality of arcuate tongues projecting from the periphery of said washer plate and extending adjacent to said angularly spaced slots for said harness elements, spring means for advancing said tongues to obstruct said slots, and a plurality of rods slidably mounted in said casing, one end of each of said rods being engaged by said control member and the other end of each of said rods engaging with said washer plate.

References Cited in the file of this patent

UNITED STATES PATENTS

| | | |
|---|---|---|
| 2,391,204 | Turner | Dec. 18, 1945 |
| 2,404,909 | Johnston | July 30, 1946 |
| 2,668,997 | Irvin | Feb. 16, 1954 |

FOREIGN PATENTS

| | | |
|---|---|---|
| 363,965 | Great Britain | Dec. 31, 1931 |
| 498,365 | Belgium | Jan. 15, 1951 |